(12) United States Patent
Kumar et al.

(10) Patent No.: US 12,143,498 B2
(45) Date of Patent: Nov. 12, 2024

(54) TRUST AND TRACEABILITY FOR SOFTWARE DEVELOPMENT LIFE CYCLE

(71) Applicant: Dell Products L.P., Round Rock, TX (US)

(72) Inventors: Dhilip S. Kumar, Bangalore (IN); Rohit Gosain, Bangalore (IN); Souptik Banerjee, Kolkata (IN); Rajesh Krishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 17/581,944

(22) Filed: Jan. 23, 2022

(65) Prior Publication Data
US 2023/0261876 A1    Aug. 17, 2023

(51) Int. Cl.
*H04L 9/32* (2006.01)
*G06F 8/10* (2018.01)
*H04L 9/00* (2022.01)
*H04L 67/1097* (2022.01)

(52) U.S. Cl.
CPC .............. *H04L 9/3236* (2013.01); *G06F 8/10* (2013.01); *H04L 9/3247* (2013.01); *H04L 67/1097* (2013.01); *H04L 9/50* (2022.05)

(58) Field of Classification Search
CPC . H04L 9/3236; H04L 9/3247; H04L 67/1097; H04L 9/50; G06F 8/10; G06F 8/71
See application file for complete search history.

(56) References Cited

U.S. PATENT DOCUMENTS

| | | | |
|---|---|---|---|
| 11,875,400 B2* | 1/2024 | Padmanabhan | G06F 16/27 |
| 2019/0349261 A1* | 11/2019 | Smith | H04L 45/20 |
| 2020/0026510 A1* | 1/2020 | Adams | G06F 8/70 |
| 2020/0034273 A1* | 1/2020 | Li | G06F 11/3676 |
| 2020/0074518 A1* | 3/2020 | Kumaraswamy | G06Q 20/12 |

OTHER PUBLICATIONS

H. Krasner, "The Cost of Poor Quality Software in the US: A 2018 Report," Consortium of IT Software Quality, Sep. 26, 2018, 44 pages.
Ibm.com, "What is Hyperledger Fabric?" https://www.ibm.com/in-en/topics/hyperledger, Accessed Nov. 16, 2021, 20 pages.
Keyence Corporation, "What is Traceability?" https://www.keyence.com/ss/products/marking/traceability/basic_about.jsp, Accessed Nov. 16, 2021, 8 pages.

* cited by examiner

*Primary Examiner* — Sm A Rahman
(74) *Attorney, Agent, or Firm* — Ryan, Mason & Lewis, LLP

(57) ABSTRACT

Techniques are provided for managing an end-to-end software development life cycle. A software development lifecycle management system performs a plurality of stages of work for developing a software application, and records transactions which result from performing the plurality of stages of work, in an immutable digital ledger. The immutable digital ledger can be a blockchain ledger.

20 Claims, 5 Drawing Sheets

200

TRUST AND TRACEABILITY FOR SOFTWARE DEVELOPMENT LIFE CYCLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates generally to software development techniques and, more specifically, to techniques for end-to-end management of a software development life cycle from requirement to release.

BACKGROUND

There are various types of software development methodologies that can be utilized to support end-to-end management of a software development life cycle (SDLC) for building software products. Such methodologies include, but are not limited to, a Waterfall model, an Agile model, a Spiral model, a rapid application development (RAD) model, etc. With these models, a software development life cycle starts with a requirements stage, and ends with a production release stage. While the intermediate stages of such models, between the requirements and production release stages, are similar, the duration of the SDLC process varies for such models.

Typically, these software development methodologies rely on different systems and tools to manage the end-to-end software development life cycle. For example, such systems include a requirement capturing tool to track software requirements, a project management tool to monitor project progress, a software development tool to tract code coverage, and a deployment tool to track changes that are deployed, etc. These disparate tools are not directly linked, which makes it difficult to, e.g., track end-to-end software delivery and progress of the activities at each stage of end-to-end software development life cycle, and to record consensus in a related manner at each stage of the software development life cycle collaboration.

Furthermore, at each stage of the SDLC process, the stakeholder/owners of respective tasks/activities are required to "sign off" (e.g., provide approval). However, the stakeholders/owners of a given stage may not have visibility of the sign-off details by stakeholders/owners of previous stages since different tools are used at every stage of the SDLC process. This discontinuity in sign-offs poses challenges with regard to project delivery timeline and accuracy. In addition, the contracts vary at each stage of the software development life cycle, e.g., the requirement stage needs a document to record the requirement and capture it in tools such as TFS/JIRA. In addition, software development codes are stored in a repository such as GITHUB/GITLAB.

SUMMARY

Exemplary embodiments of the disclosure include techniques for managing an end-to-end software development life cycle. For example, an exemplary embodiment includes a method that is performed by a software development lifecycle management system. The software development lifecycle management system performs a plurality of stages of work for developing a software application, and records transactions which result from performing the plurality of stages of work, in an immutable digital ledger. In some embodiments, the immutable digital ledger comprises a blockchain ledger.

Other embodiments of the disclosure include, without limitation, apparatus and articles of manufacture comprising processor-readable storage media for managing an end-to-end software development life cycle.

DETAILED DESCRIPTION

Exemplary embodiments of the disclosure will now be described in further detail with regard to systems and methods for managing an end-to-end software development life cycle by utilizing an immutable digital ledger (e.g., permissioned blockchain) to securely record transactions associated with stages of the software development life cycle. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
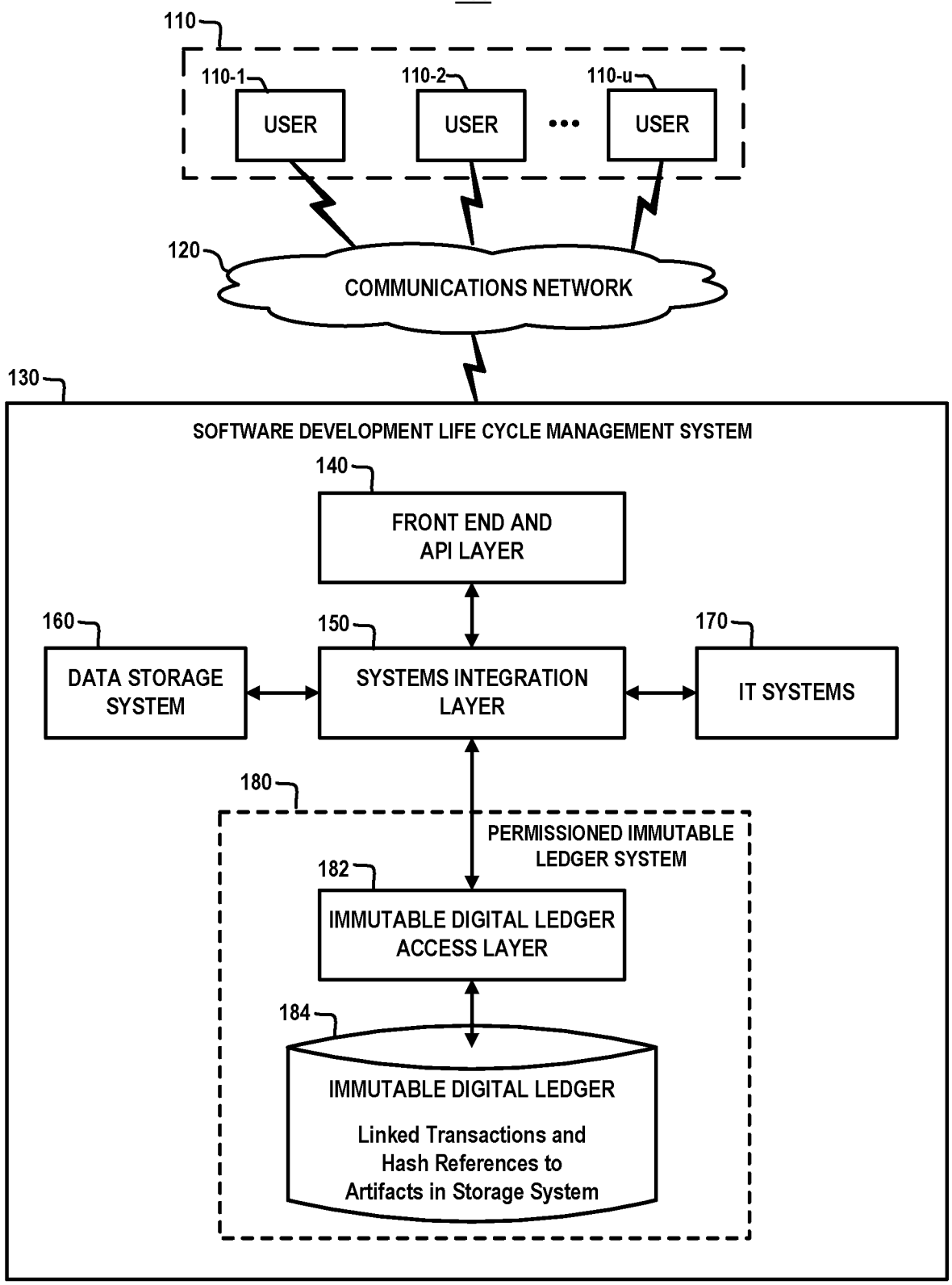
FIG. 1 schematically illustrates a network computing system comprising a software development life cycle management system which implements an immutable digital ledger to securely record transactions associated with an end-to-end stages of software development, according to an exemplary embodiment of the disclosure.

FIG. 1 schematically illustrates a network computing system 100 comprising a software development life cycle management system which implements an immutable digital ledger to securely record transactions associated with an end-to-end stages of software development, according to an exemplary embodiment of the disclosure. The system 100 comprises a plurality of users 110-1, 110-2, . . . 110-u (collectively, users 110), a communications network 120, and a software development life cycle (SDLC) management system 130. The SDLC management system 130 comprises a front end and application programming interface (API) layer 140, a systems integration layer 150, a data storage system 160, a plurality of internet technology (IT) systems 170, and a permissioned immutable ledger system 180 (e.g., permissioned blockchain system). The permissioned immutable ledger system 180 comprises an immutable digital ledger access layer 182, and an immutable digital ledger 184, the functions of which will be described in further detail below.

The users 110 comprise various user personas such as customers and a team of individuals involved in the development and testing of software including, but not limited to, product owner, business analysts, software architects, development leads, test leads, release managers, support engineers, and other types of stakeholders. The users 110 can access the SDLC management system 130 over the communications network 120 using various types of computing devices such as a desktop computer, a laptop computer, a workstation, a computer server, a smart phone, an electronic tablet, etc.

While the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols.

The SDLC management system 130 implements methods that are configured to support various phases of an end-to-end software development life cycle for producing and delivering software products (e.g., applications, services, platforms, etc.). The SDLC management system 130 is configured provide trust and traceability of the end-to-end software development life cycle by tracking software requirements of a given software product from idea to production, and maintaining an immutable digital ledger of transactions which is configured securely track and record artifacts and milestones at each phase of the end-to-end software development life cycle. As explained in further detail below, in some embodiments, the immutable digital ledger of transactions is implemented using a permissioned blockchain system that is configured to operate in conjunction with various software development, testing, and production tools to provide a single view of a software project requirements delivery lifecycle.

Within the SDLC management system 130, the front end and API layer 140 provides user interfaces and associated APIs that allow the users 110 to access the various services and tools that are implemented by the SDLC management system 130 for developing and delivering software products. For example, the front end and API layer 140 provides a login portal to allows users 110 to login to the SDLC management system 130 and provide credentials for a user authentication/verification process. In some embodiments, the login portal comprises different user interfaces to support connectivity with different types of devices, e.g., mobile devices, desktop computers, servers, etc., and different types of HTML-based browsers. In addition, the front end and API layer 140 comprises an API gateway which provides a single-entry point for users 110 to issue API requests for tools and services that that are provided by the SDLC management system 130. Moreover, the front end and API layer 140 comprises a state management layer to (i) handle actions generated by users 100, (ii) fetch and update data, (iii) manage interactions between the user interface and backend systems, etc. In addition, the front end and API layer 140 implement other functions for service discovery, load balancing, etc.

The systems integration layer 150 is configured to integrate disparate IT systems 170 to work together and in conjunction with the permissioned immutable ledger system 180. The IT systems 170 comprise SDLC tools/systems to support the software development lifecycle for a given software product. For example, SDLC tools/systems include, but are not limited to a project management tool for monitoring the progress of developments, a software development tool to tract the code generation and coverage, a deployment tool to track changes deployed, and other SDLC tools that are utilized by stakeholders/owners to track and manage the development and delivery of a given software products at every phase of the software development life cycle. In addition, the IT systems 170 comprise enterprise IT systems such as human resources management system (HRMS), an asset management system, etc., which are utilized to fetch resource details.

The systems integration layer 150 and the permissioned immutable ledger system 180 collectively serve to directly link all the SDLC tools/systems in a way that enables all artifacts that are generated by the SDLC tools during the software development lifecycle for a given software product to be securely stored in the data storage system 160, and generating and updating the immutable digital ledger 184 to include a chain of immutable records which are associated with the artifacts, and which securely tracks a sequential progress of steps/activities performed in conjunction with end-to-end software development and delivery of a given software product.

Within the permissioned immutable ledger system 180, the immutable digital ledger access layer 182 implements methods that are configured to update the immutable digital ledger 184 with new records associated with artifacts, and methods that enable permissioned users to access the immutable digital ledger 184 for purposes of, e.g. tracing the progress of activities for the various phases of the software development lifecycle for a given software product, accessing sign-off (e.g., approvals) by stakeholders/owners of various phases of the software development lifecycle for the given software product, etc.

The immutable digital ledger 184 comprises a linked list of transactions/records associated with artifacts, and cryptographic hashes which reference respective artifacts that are stored in the data storage system 160. The immutable digital ledger 184 is generated using any suitable technology that allows the records of the digital ledger to remain unchanged, unaltered, and indelible. In some embodiments, the immutable digital ledger 184 comprises a blockchain ledger that is implemented using any suitable blockchain technology in which each record (e.g., transaction details) is stored using a cryptographic hash value (alphanumeric string generated for each block individually). In some embodiments, each block/record in the immutable digital ledger 182 comprises a hash value or digital signature for itself and for a previous block/record as well, which ensures that the blocks/records are retroactively coupled together and unrelenting. In this regard, the functionality of blockchain technology ensures that no one can interfere with the system or change the information saved into the immutable blocks/records.

As noted above, each artifact or group of artifacts which is generated during the software development lifecycle for a given software product is stored in the data storage system 160 (e.g., artifact repository). In addition, immutable records of such artifacts are generated and stored in the immutable digital ledger, wherein the records comprise hashes that are referenced to associated artifacts that are stored in the data storage system 160. With regard to end-to-end software development and delivery, the term "artifact" as used herein referents to anything that is created/generated as a by-product of end-to-end software development and delivery.

For example, such artifacts comprise code-related artifacts, project management artifacts, documentation, etc. Code-related artifacts comprise source codes, test suites (coded tests to run to ensure a coded process is working properly), compiled code that is delivered, test outputs (e.g., logs and information generated from testing processes), etc. Further, document artifacts comprise any type of documentation which is related to the software product being produced through the end-to-end development process. For example, document artifacts include, but are not limited to, class diagrams to visualize internal processes of a given program), end-user agreements, internal documents (e.g., meeting notes) that allow developers, bug-fixers, programmers, etc., to understand and improve the software product being developed, and software documents which describe the characteristics or attributes of a software product (e.g., software architecture, technical issues, end-user processes, marketing, etc.). The project management artifacts comprise artifacts that are generated during a project management phase such as, e.g., user cases/stories (artifact which describe what the program should do in specific, technical terms), criteria artifacts which specify requirements of the software product and project.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types.

Figure 2:
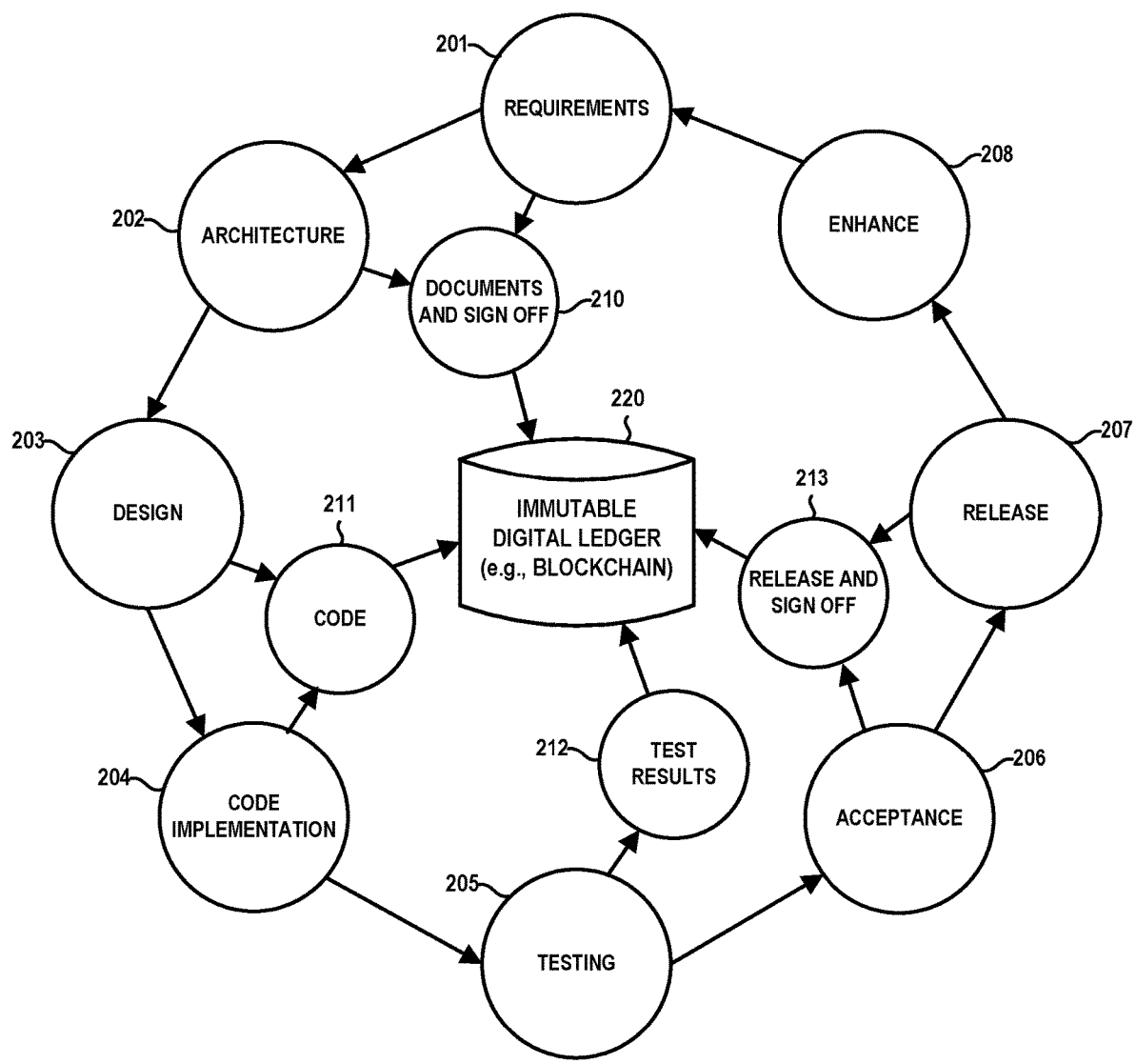
FIG. 2 schematically illustrates stages of a software development life cycle and associated artifacts that are generated at each stage and recorded in an immutable digital ledger, according to an exemplary embodiment of the disclosure.

FIG. 2 schematically illustrates stages of a software development life cycle and associated artifacts that are generated at each stage and recorded in an immutable digital ledger, according to an exemplary embodiment of the disclosure. As shown in FIG. 2, an exemplary software development life cycle 200 comprises a requirement gathering stage 201, an architecture stage 202, a design stage 203, a code implementation stage 204, a testing stage 205, an acceptance stage 206, a release stage 207, and a maintenance/enhance stage 208. As further shown in FIG. 2, various stages generate respective artifacts 210, 211, 212, and 213 associated with transactions/activities that are performed during the various stages of the software development life cycle 200, wherein the respective artifacts 210, 211, 212, and 213 are stored as immutable records in an immutable digital ledger 220 (e.g., blockchain ledger).

For example, the requirements gathering stage 201, and the architecture stage 202 generate artifacts 210 such as requirement documents, architecture documents, and sign-off/approval documents by the stakeholders that perform such stages. The design stage 203 and the code implementation stage 204 generate artifacts 211 such as code-related artifacts. The testing stage 212 generates artifacts 212 related to test procedures and test results. The acceptance stage 206 and release stage 207 generate artifacts 213 such as quality assurance sign-offs/approvals by stakeholders to indicate that the given software product meets specified standards for quality and performance, documents related to the release and deployment of a software product into a production environment, and associated release sign-offs/approvals by stakeholders with regard to the release and deployment of the software product.

In the exemplary software development life cycle 200 of FIG. 2, the requirement gathering stage 201 involves a given stakeholder (e.g., product owner, or project manager) working to identify, gather, and define current problems, requirements, requests, and customer expectations related to the given software product (e.g., software application or service) to be developed. The activities related to the requirements stage 201 include, e.g., creating software specifications, creating a detailed plan, issue tracking, project planning, allocating resources, etc. The specification of software product requirements provides relevant information and context needed for development teach to deliver and produce a given software solution.

Further, the design stage 203 is performed by the stakeholders responsible for making software design decisions regarding the architecture and make of the software solution based on the specified requirements and criteria. These processes involve, e.g., creating design documents, coding guidelines, and discussing the tools, practices, runtimes, or frameworks that will help the development team meet the software requirement specification and goals defined in the requirements phase 201. Next, the code implementation stage 204 comprises a software development stage in which responsible stakeholders build the software solution according to the design decisions of the design stage 203 while attempting to meet the goals and outcomes specified by the software requirements phase 201 by implementing the software solution. The design stage 203 of work is complete when the responsible stakeholders have packaged and built the software code.

Next, the testing stage 205 involves testing the given software solution to check quality and performance acceptance to ensure that the given software solution as implemented meets specified standards for quality and performance. The testing stage 205 of work comprises, e.g., unit testing, performing integration and end-to-end tests, performing verification/validation, and reporting or identifying bugs or defects in the software solution. This can involve unit testing, performing integration and end-to-end tests, verification/validation, and reporting or identifying bugs or defects in the software solution. The acceptance phase 206 is performed by the stakeholders that are responsible for validating that the given software solution as implemented meets specified standards for quality and performance based on the test results and other artifacts that are generated and recorded as part of the testing stage 205.

Further, the release stage 207 (or deployment stage) is performed by the stakeholder responsible for deploying the accepted software solution into a production environment. The release stage 207 of work comprises provisioning and configuring the infrastructure (e.g., on-premises system, or cloud computing system) of a customer, and defining a software deployment strategy for delivering changes to the customer. The enhance stage 208 is a stage in which the software solution is operationalized to monitor, control, and detect performance issues or incidents related to the deployment. This stage of work can involve reviewing, understanding, and monitoring network settings, infrastructure configurations, and performance of application services in production. This process can involve incident resolution or management in the course of any issues or changes made to impact a customer or user base.

Figure 3:
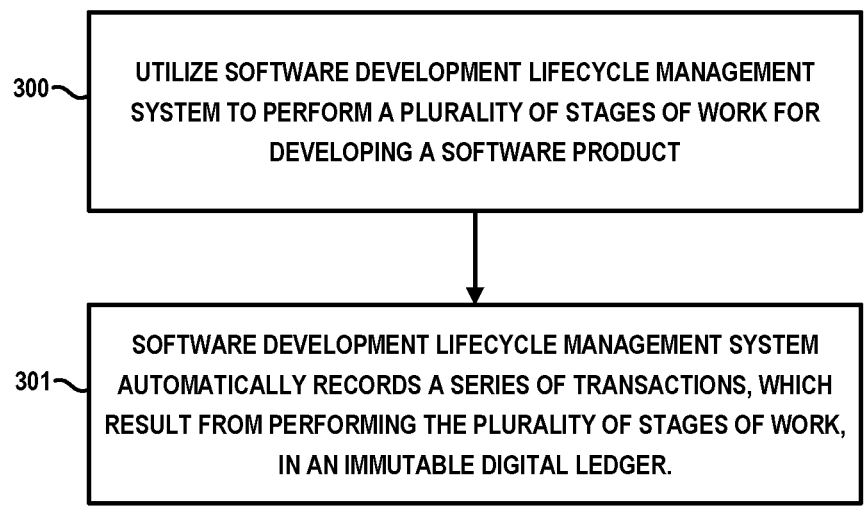
FIG. 3 illustrates a flow diagram of a method for managing an end-to-end software development life cycle by utilizing an immutable digital ledger to securely record transactions associated with stages of the software development life cycle, according to an exemplary embodiment of the disclosure.

FIG. 3 illustrates a flow diagram of a method for managing an end-to-end software development life cycle by utilizing an immutable digital ledger to securely record transactions associated with stages of the software development life cycle, according to an exemplary embodiment of the disclosure. In some embodiments, FIG. 3 illustrates an exemplary high-level mode of operation of the SDLC management system 130 of FIG. 1 which comprises utilizing the SDLC management system to perform a plurality of stages work for developing a software product (block 300), and automatically recording a series of transactions, which result from performing the plurality of stages of work, in an immutable digital ledger (block 301). In some embodiments, the stages of work include stages of the exemplary software development life cycle 200 of FIG. 2. The transactions that are recorded comprises critical milestones for traceability, artifacts, and sign-offs/approvals by various stakeholders, etc.

It is to be appreciated that the exemplary embodiments discussed herein overcome the above and other drawbacks with existing software development life cycle tools by utilizing an immutable digital ledger technology, such as blockchain ledger technology, to provide an end-to-end connected and immutable software development life cycle management methodology and system which, inter alia, increases the trust level of the customer and also improves delivery accuracy and product stability. For example, the use of an immutable digital ledger to record transactions enables the creation of strong trusted links between critical artifacts that are generated at various stages of a software development life cycle, whereby the immutable digital ledger provides a single source of trust and veracity of all artifacts for which immutable records are generated and added to the immutable digital ledger. In addition, the use of an immutable digital ledger to record and track all sign-offs/approvals by stakeholders at various stages of the software development life cycle enhances the access and visibility of such sign-offs/approvals. In some embodiments, all sign-offs/approvals are securely stored in a distributed storage system (e.g., NAS) and securely recorded in the immutable digital ledger. Moreover, all milestones for the SDLC phases are recorded in the immutable digital ledger, which enables ease of traceability of transactions related to the life cycle of requirements back and forth, linking requirements to test cases, design specifications, etc. In addition, all reports can be stored in the distributed data storage system, while their hash is stored in records of the immutable digital ledger (e.g., permissioned blockchain), which prevents tampering of such reports/artifacts.

In addition, illustrative embodiments track the traversal of software assets (e.g., software products and/or software services) through their software development life cycles, e.g., an idea gets converted into a requirement captured on a tool, and manifests itself into a usable feature on a software product as it passes through the SDLC. Also, since delivery of the software asset involves multiple parties such as, e.g., customers, delivery teams, and consulting companies to which work is outsourced, illustrative embodiments break down the software asset into software requirements that can be used as units to track from design to implementation across all the involved parties.

For example, in one or more illustrative embodiments, the proposed solution meets the following requirements: (i) support the reporting requirements of multiple user personas including, but not limited to, customer, business analyst, architect, development lead, test lead, release manager, support engineer, etc.; (ii) interact with enterprise IT systems such as, but not limited to, human resources (HR), asset management, etc., to fetch resource details; (iii) access to a storage system such as, but not limited to, NAS to store artifacts pertaining to software delivery such as, but not limited to, status reports, sign-offs, etc.; (iv) facilitate the identification of a clear owner of a given requirement in its deployment journey; (v) provide traceability of a requirement from conception to deployment with a record of all parties and an association of artifacts pertaining to the different phases of the software development life cycle; and (vi) provide hashing and encryption features to ensure confidentiality.

As noted above, in some embodiments, the permissioned immutable ledger system 180 is implemented using a permissioned blockchain network. The permissioned blockchain network can be implemented using any suitable blockchain technology and platform including, but not limited to Hyperledger (open source blockchain platform) and other suitable blockchain-based distributed ledger software platforms. As is known in the art, a blockchain is essentially a digital ledger of transactions that is duplicated and distributed across a plurality of compute nodes of a blockchain network. A blockchain comprises list of records (called bocks) that are linked together using cryptography. For example, each block within the blockchain comprises a cryptographic hash which is generated exclusively for the data of the block and with a hash for a previous block, and a time stamp. In this regard, each block contains information about a previous block to thereby form chain of blocks that are resistant to modification of the data of the blocks because once recorded, the data in any given block cannot be altered retroactively without altering all subsequent blocks.

In addition, in some embodiments, a blockchain system implements a "smart contracts" platform to record transactions in a blockchain. Smart contracts comprise programs that are stored on a blockchain, and run when predetermined conditions are met. In some embodiments, smart contracts operate using "if/when . . . then . . . " statements that are written into code on a blockchain. The system executes actions when predetermined conditions have been met and verified, and the blockchain is updated when the transaction is completed. In this regard, the transaction cannot be altered and only permissioned parties can view the transaction results.

Furthermore, a blockchain is typically managed by a peer-to-peer network of nodes, wherein the nodes of the network collectively implement a given protocol to communicate and validate new blocks. In this regard, a blockchain ledger is distributed across several nodes on a peer-to-peer network, where each node replicates and saves an identical copy of the blockchain ledger and updates the local copy independently. A consensus is made among the different nodes storing a copy of the blockchain data to ensure that the integrity of the data is maintained.

In accordance with exemplary embodiments discussed herein, the implementation of an immutable digital ledger such as a blockchain for software development provides a mechanism to provide a trusted and immutable chain of custody for requirements of a software product at every stage of the software development life cycle. In some embodiments, requirements of a software product are represented as digital assets to enable clear ownership, traceability and immutability for tamper-proof artifacts. More specifically, in some embodiments, digital asset tokens are utilized to represent any requirement, ownership, stakeholders, and their agreed sign-off details. The digital asset tokens, distributed ledgers, and smart contracts accurize the requirements. Also, each requirement is delivered by enabling an end-to-end tracking of the requirement from a requirements phase to a release phase.

The immutability of a digital ledger such as a blockchain ledger, and a distributed nature of the immutable digital ledger addresses a wide range of needs, from the business requirement, code producers to tester, acceptance criteria, and users who hold different functional roles in the software development life cycle management system can interact effectively. The consistent interaction between the various stakeholders on the same system (e.g., blockchain network) results in the creation of a strong link between the SDLC stages for each specified requirement of a given software product, and allows the quality of the delivered software product to be measured at every SDLC stage.

Furthermore, the use of an, e.g., immutable blockchain ledger, provides a tamper-resistant transaction system which comprises a hash-calculated block of transactions in which the blocks record the contents of the transaction in a secured manner. The tamper-proof, provenance tracking, and self-enforcing smart contracts of the on-chain stored software development life cycle transaction provide improved functionalities for SDLC management as described herein. Further, the immutable write action and distributed storage are provided to develop a secure software development life cycle transaction system with a privacy-preserving layer. The use of an immutable digital ledger for SDLC management allows the stakeholders of a given software project to improve the reliability and security of their logging information, ensuring that the logging information is tamper-resistant. A permissioned blockchain limits access to only authorized parties, and grants full read-access to all of those authorized.

In some embodiments, an additional encryption layer is utilized to encrypts the data before writing the data to the blockchain, which provides privacy between authorized parties. In some embodiments, a permissioned blockchain is limited in the data size that can be written to given block in a single transaction. In this regard, storing large log files may require many transactions. In addition to adding a privacy layer, in some embodiments, a mechanism is implanted to enable data to be stored off the blockchain (in e.g., encrypted form) to ensure high throughput while still being able to manage the integrity of this data on the permissioned blockchain. All of the above functionalities provide confidentiality, integrity, and availability.

The use of a permissioned blockchain-based traceability system according to exemplary embodiments of the disclosure provides a solution to address the weak link, distorted process challenges of conventional SDLC methodologies which utilize disparate and unlinked tools for different stages of the SDLC process, by ensuring seamless information sharing among stakeholders of the software development life cycle process. Indeed, an immutable ledger system (e.g., permissioned blockchain system) according to exemplary embodiments of the disclosure is configured to track and record all the information (e.g., artifacts) related to each stage of software development while safeguarding crucial and sensitive data throughout the lifecycle, which allows customers to know that the software product that is delivered (or to be delivered) is authentic, complies with all standards, legal resources, and quality assurance. The trust and traceability of the SDLC process as provided by an interlinked hash function of a blockchain ledger, provides such customer assurance.

The implementation of a single immutable digital ledger such as a blockchain ledger enables the realization of a SDLC process with a trusted requirements data source where software requirement records, once created and confirmed, cannot be altered or removed from the immutable digital ledger. The process captures and replicates the software requirements with a high degree of transparency and accountability. In addition, the approval (sign-off) process for each stage of the SDLC process is implemented through simplified consensus protocols with trusted parties (e.g., smart contracts), which allows the stakeholders to maintain and validate the software requirements over the SDLC process using the immutable digital ledger.

Figure 4:
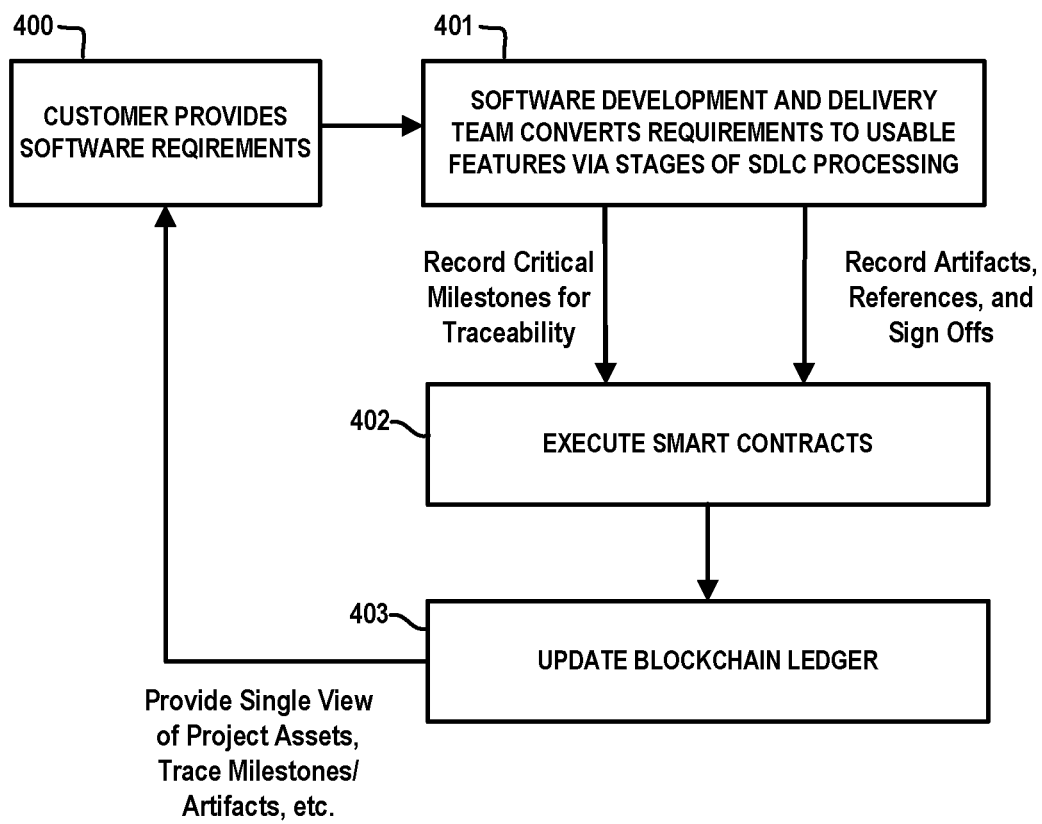
FIG. 4 schematically illustrates a process for managing an end-to-end software development life cycle by utilizing an immutable digital ledger to securely record transactions associated with stages of the software development life cycle, according to another exemplary embodiment of the disclosure.

FIG. 4 schematically illustrates a process for managing an end-to-end software development life cycle by utilizing an immutable digital ledger to securely record transactions associated with stages of the software development life cycle, according to another exemplary embodiment of the disclosure. In particular, FIG. 4 illustrates a method for managing an end-to-end software development life cycle by utilizing a blockchain ledger in conjunction with a smart contracts system to securely record transactions associated with stages of the software development life cycle. As shown in FIG. 4, a customer provides software requirements to a software development and delivery team (block 400). The requirements are registered and converted to usable features at various stages of SDLC processing (block 401). At various stages of the SDLC process, stakeholders perform various activities which require, e.g., recording critical milestones for traceability, recording artifacts, documents, sign-offs, etc. The transactions associated with such artifacts, milestones, sign-offs, etc., and processed by execution of smart contracts (block 402), and a blockchain is updated (block 403) when a given transaction is completed.

At any given point in time, current state of the blockchain provides a single view of the digital assets of the given project and enables traceability of milestones and artifacts associated with the given project, which are recorded in the immutable digital ledger provided by the blockchain. In this regard, at any given point in time, the customer can view the current state of the blockchain and thus, easily track the end-to-end software delivery and progress at each of the steps/activities.

Figure 5:
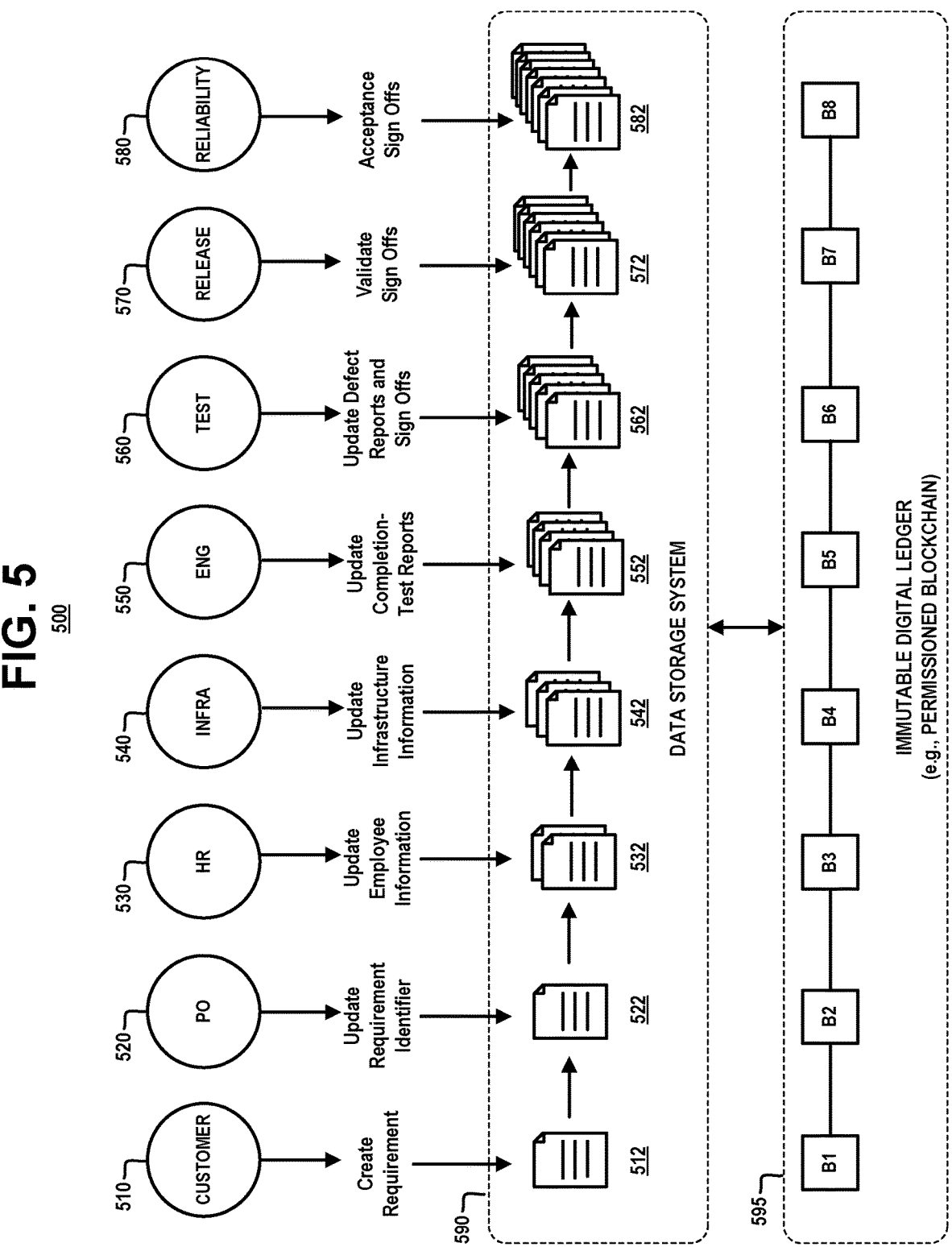
FIG. 5 schematically illustrates a process for managing an end-to-end software development life cycle by utilizing an immutable digital ledger to securely record transactions associated with stages of the software development life cycle, according to another exemplary embodiment of the disclosure.

FIG. 5 schematically illustrates a process for managing an end-to-end software development life cycle by utilizing an immutable digital ledger to securely record transactions associated with stages of the software development life cycle, according to another exemplary embodiment of the disclosure. More specifically, FIG. 5 schematically illustrates a process for tracking a lifecycle of a software requirement as the requirement flows through various SDLC stages, according to an exemplary embodiment. FIG. 5 illustrates various actions that are performed by different stakeholders 510, 520, 530, 540, 550, 560, 570, and 580 that are actively involved in a software project through a software development lifecycle.

For example, a customer 510 creates requirements of for the software project. A product owner (PO) 520 (e.g., project manager) confirms the requirements and assigns requirement identifiers (ID). The human resource stakeholder(s) 530 provide updated employee information regarding individual resources that are part of the software development and delivery team and which meets criteria for working on the project and accessing associated resources. The stakeholder(s) 540 responsible for the infrastructure stage provide infrastructure information and register associated assets which meets the requirements. The stakeholder(s) 550 (e.g., UX/UI engineers) responsible for software design and development provide updated completion test reports and sign-offs on completed software products. The stakeholder(s) 560 responsible for quality testing provide updated defect/bug reports and sign-offs. The stakeholder(s) 570 responsible for software release validate the sign-offs of previous stages. The stakeholder(s) responsible software product reliability provide acceptance sign-offs.

As shown in FIG. 5, the various requirements, artifacts, documents, sign-offs, etc. provided by the stakeholders 510, 520, 530, 540, 550, 560, 570, and 580 are stored in a data storage system 590 such that each stage of the SDLC management process, a respective set of documents 512, 522, 532, 542, 552, 562, 572 and 582 is updated and grows over time. In some embodiments, the set of documents 512, 522, 532, 542, 552, 562, 572 and 582 at any given point are encrypted. As further shown in FIG. 5, as artifacts, documents, sign-offs, etc., associated with a given requirement are stored in the data storage system 590, new immutable records (e.g., blocks B1, B2, B3, B4, B5, B6, B7, and B8) are created and added to an immutable digital leger 595 (e.g., blockchain ledger). As noted above, the immutable records comprise cryptographic hashes which refer to artifacts, documents, sign-offs, etc., associated with a given requirement are stored in the data storage system 590.

As noted above, each software requirement can be delivered by enabling an end-to-end tracking from the requirement phase to the release phase by treating software requirement as digital assets. For example, a requirement identifier can be assigned to given requirement for the software application, and the system will record transactions associated with the given requirement in an immutable digital ledger, wherein the associated transactions reference the assigned requirement identifier of the given requirement. The following exemplary code illustrates an exemplary transaction model for a given requirement which is completely populated with all relevant information after completion of an end-to-end software development life cycle.

```
{
  "Key": "100001",
  "Record": {
    "projectID": "Project1",
    "requirementID": "100001",
    "sdlcPhaseOwnerEmpID": "Emp90001",
    "sdlcPhaseOwnerLocation": "India",
    "sdlcPhaseOwnerCitizenship": "Indian",
    "assetID": "Asset1",
    "gitProjectID": "git_project_100001",
    "testProjectID": "mstest_100001",
    "CRQ": "crq_100001"
    "LastUpdatedDate": "Tue, 28 Sep 2021 10: 41: 48 UTC",
    "References": [
      {
        "Phase": "Requirement Document",
        "PhaseApproved": "true",
        "Signoff":
    http://requirementstore.com/"100001"
      },
      {
        "Phase": "Design Document",
        "PhaseApproved": "true",
        "Signoff":
    http://designdocument.com/"100001"
      },
      {
        "Phase": "Development",
        "PhaseApproved": "true",
        "Signoff":
    http://gitlab.com/git_project_"100001"
      },
      {
        "Phase": "Testing",
        "PhaseApproved": "true",
        "Signoff":
    http://mstestool.com/git_project_"100001"
      },
      {
        "Phase": "Release",
        "PhaseApproved": "true",
        "Signoff":
    http://crqtool.com/git_project_"100001"
      }
    ]
  }
}
```

The exemplary transaction model comprises a key to reference various transactions, and identifiers such as a project ID, a requirement ID, a phase owner employee ID, a phase owner location and citizenship, an asset ID, a GIT project ID, a test report ID, and a change request (CRQ). In addition, the exemplary transaction model comprises references with respect to different phases (e.g., a requirements phase, a design phase, a development phase, a testing phase, and a release phase), a state of approval (sign-off) for each of the different phases, and the location of the associated sign-off artifacts. In addition, the exemplary transaction model specifies transactions such as create requirement, assign resource, assign asset, design, develop, test, and release.

As demonstrated above, by converting the requirements of a software project into digital assets, an immutable digital ledger (e.g., permissioned blockchain) can be utilized to track the ownership and quality aspects of all requirements of the software project from the requirements phase to the release phase. The use of an immutable digital ledger provides trust across multiple parties/user personas since all parties can register their transactions onto a single immutable digital ledger refer back without any conflict.

The use of an immutable digital ledger is particularly important for software projects, such as government related software projects, which have strict mandatory requirements. For example, certain government related software projects have requirements which (i) require the resources working on the project have certain citizenship, (ii) require that the infrastructure used should be on a separate domain and subnet, (iii) require the infrastructure used should be from data centers within a specified geolocation (e.g., within a given country), (iv) require that access to resources should be only to those with a given level of security clearance (e.g., red badge access), etc. A software project with such stringent restrictions would benefit from implementing an immutable digital ledger to record transactions/artifacts associated with the software project as the immutable digital ledger would enable tamper-proof auditing and traceability to ensure quality assurance.

In all instances, advantageously, the use of an immutable digital ledger (e.g., blockchain ledger) for SDLC management would enable (i) tracking changes of ownership at every stage of the SDLC process, (ii) strict auditing across the stages of the SDLC process, (iii) synchronization of the statuses/metrics at any stage of the SDLC process, (iv) forward, backward, and bidirectional tracing of the project activities, (v) ease of collaboration between stakeholders of the SDLC process, (vi) the automated creation of soft contracts at each stage of the SDLC process, (vii) measuring the velocity of the software project from the requirement phase to the deployment phase, etc.

Figure 6:
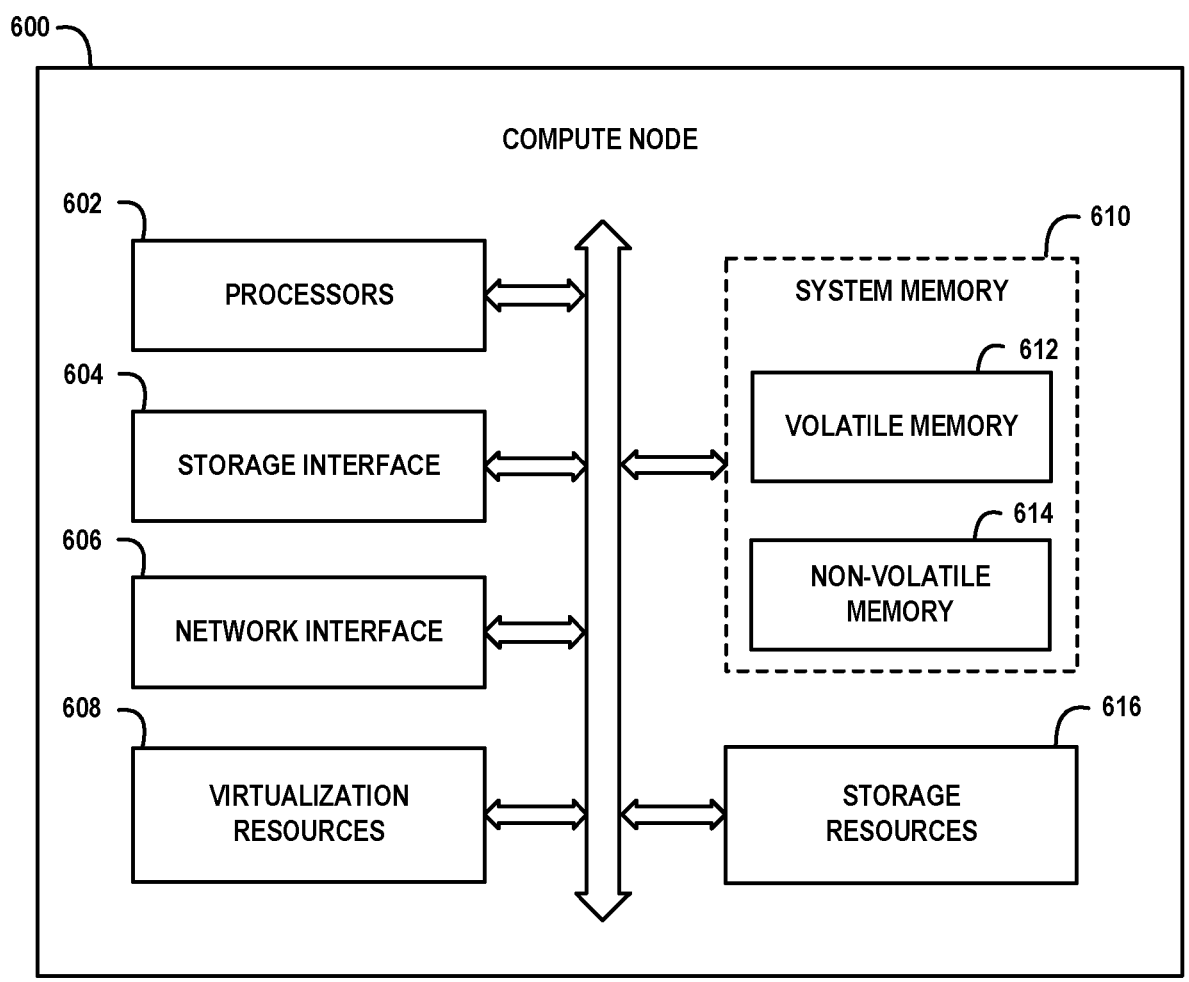
FIG. 6 schematically illustrates framework of a compute node which can host the software development life cycle management system of FIG. 1, according to an exemplary embodiment of the disclosure.

FIG. 6 schematically illustrates framework of a compute node 600 which can host the software development life cycle management system of FIG. 1, according to an exemplary embodiment of the disclosure. The compute node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the compute node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 606 enables the compute node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the compute node 600. For example, the virtualization resources 608 can be configured to implement the various modules and functionalities of a software development lifecycle management system as discussed herein. In some embodiments, the virtualization resources 608 comprise virtual machines that are implemented using a hypervisor platform which executes on the compute node 600, wherein one or more virtual machines can be instantiated to execute functions of the compute node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the compute node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the compute node 600 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of storage control systems and associated write cache managing systems as discussed herein are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of non-volatile memory devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the compute node 600, and to temporarily store data that is utilized and/or generated by the native OS and application programs and processes running on the compute node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
performing, by a software development lifecycle management system, a plurality of stages of work for developing a software application; and
recording, by the software development lifecycle management system, transactions which result from performing the plurality of stages of work, in an immutable digital ledger, wherein recording transactions in the immutable digital ledger comprises:
recording a given specification for at least one stage of work for developing the software application as a transaction in the immutable digital ledger, wherein the given specification for the at least one stage of work comprises at least one of a security compliance specification and a resource usage specification;
recording an assignment of a specification identifier to the given specification for the software application as a transaction in the immutable digital ledger; and
for a given transaction performed during the development of the software application, which is associated with the given specification, recording the associated transaction in the immutable digital ledger with a reference to the assigned specification identifier of the given specification;
wherein recording transactions in the immutable digital ledger further comprises executing an automated agreement protocol of the immutable digital ledger to automatically record a given transaction in the immutable digital ledger.

2. The method of claim 1, wherein the immutable digital ledger comprises a blockchain ledger.

3. The method of claim 1, further comprising storing artifacts, which are associated with respective transactions recorded in the immutable digital ledger, in a data storage system, wherein each recorded transaction in the immutable digital ledger comprises a cryptographic hash which references an associated artifact stored in the data storage system.

4. The method of claim 3, wherein storing the artifacts comprises encrypting the artifacts and storing the encrypted artifacts in the data storage system.

5. The method of claim 3, wherein the artifacts comprise one or more of code-related artifacts, reports, sign-offs, and milestones of activities associated with one or more of the stages of work.

6. The method of claim 1, wherein executing the automated agreement protocol of the immutable digital ledger comprises executing a smart contract to record a given transaction in the immutable digital ledger.

7. An article of manufacture comprising a non-transitory processor-readable storage medium having stored therein program code of one or more software programs, wherein the program code is executable by one or more processors to implement a method comprising:
performing, by a software development lifecycle management system, a plurality of stages of work for developing a software application; and
recording, by the software development lifecycle management system, transactions which result from performing the plurality of stages of work, in an immutable digital ledger, wherein recording transactions in the immutable digital ledger comprises:
recording a given specification for at least one stage of work for developing the software application as a transaction in the immutable digital ledger, wherein the given specification for the at least one stage of work comprises at least one of a security compliance specification and a resource usage specification;

recording an assignment of a specification identifier to the given specification for the software application as a transaction in the immutable digital ledger; and for a given transaction performed during the development of the software application, which is associated with the given specification, recording the associated transaction in the immutable digital ledger with a reference to the assigned specification identifier of the given specification;

wherein recording transactions in the immutable digital ledger further comprises executing an automated agreement protocol of the immutable digital ledger to automatically record a given transaction in the immutable digital ledger.

8. The article of manufacture of claim 7, wherein the immutable digital ledger comprises a blockchain ledger.

9. The article of manufacture of claim 7, further comprising program code that is executable by the one or more processors for storing artifacts, which are associated with respective transactions recorded in the immutable digital ledger, in a data storage system, wherein each recorded transaction in the immutable digital ledger comprises a cryptographic hash which references an associated artifact stored in the data storage system.

10. The article of manufacture of claim 9, wherein the program code for storing the artifacts comprises program code for encrypting the artifacts and storing the encrypted artifacts in the data storage system.

11. The article of manufacture of claim 9, wherein the artifacts comprise one or more of code-related artifacts, reports, sign-offs, and milestones of activities associated with one or more of the stages of work.

12. The article of manufacture of claim 7, wherein the program code for executing the automated agreement protocol of the immutable digital ledger comprises program code for executing a smart contract to record a given transaction in the immutable digital ledger.

13. An apparatus, comprising:
at least one processor; and
system memory configured to store program code, wherein the program code is executable by the at least one processor to instantiate a software development lifecycle management system which is configured to:
perform a plurality of stages of work for developing a software application; and
record transactions which result from performing the plurality of stages of work, in an immutable digital ledger, wherein in recording transactions in the immutable digital ledger, the software development lifecycle management system is configured to:
record a given specification for at least one stage of work for developing the software application as a transaction in the immutable digital ledger, wherein the given specification for the at least one stage of work comprises at least one of a security compliance specification and a resource usage specification;

record an assignment of a specification identifier to the given specification for the software application as a transaction in the immutable digital ledger; and for a given transaction performed during the development of the software application, which is associated with the given specification, record the associated transaction in the immutable digital ledger with a reference to the assigned specification identifier of the given specification;

wherein in recording transactions in the immutable digital ledger, the software development lifecycle management system is further configured to execute an automated agreement protocol of the immutable digital ledger to automatically record a given transaction in the immutable digital ledger.

14. The apparatus of claim 13, wherein the immutable digital ledger comprises a blockchain ledger.

15. The apparatus of claim 13, wherein the software development lifecycle management system is further configured to store artifacts, which are associated with respective transactions recorded in the immutable digital ledger, in a data storage system, wherein each recorded transaction in the immutable digital ledger comprises a cryptographic hash which references an associated artifact stored in the data storage system.

16. The apparatus of claim 15, wherein the artifacts comprise one or more of code-related artifacts, reports, sign-offs, and milestones of activities associated with one or more of the stages of work.

17. The apparatus of claim 13, wherein in executing the automated agreement protocol of the immutable digital ledger, the software development lifecycle management system is configured to execute a smart contract to record a given transaction in the immutable digital ledger.

18. The method of claim 1, further comprising integrating a plurality of disparate software development tools with an immutable ledger system which is configured to record transactions that are performed using each of the plurality of disparate software development tools, in the immutable digital ledger.

19. The article of manufacture of claim 7, further comprising program code that is executable by the one or more processors for implementing a systems integration platform that is configured to integrate a plurality of disparate software development tools with an immutable ledger system which is configured to record transactions that are performed using each of the plurality of disparate software development tools, in the immutable digital ledger.

20. The apparatus of claim 13, wherein the program code is executable by the at least one processor to instantiate a systems integration platform that is configured to integrate a plurality of disparate software development tools with an immutable ledger system which is configured to record transactions that are performed using each of the plurality of disparate software development tools, in the immutable digital ledger.

* * * * *